United States Patent [19]

Biswas et al.

[11] Patent Number: 5,391,670

[45] Date of Patent: Feb. 21, 1995

[54] ALKYLATION RESINS FROM POLYCYCLIC AROMATIC COMPOUNDS

[75] Inventors: Atanu Biswas, Newark; Daniel W. Klosiewicz, Wilmington, both of Del.

[73] Assignee: Hercules Incorporated, Wilmington, Del.

[21] Appl. No.: 103,461

[22] Filed: Aug. 9, 1993

[51] Int. Cl.$^6$ .................. C08F 36/00; C08F 47/00; C08F 4/06; C08F 4/14

[52] U.S. Cl. .................................. 526/284; 526/237; 526/280; 526/281; 526/282; 526/283; 526/290; 525/97; 525/98; 525/133; 525/185; 525/189; 525/534; 525/535; 525/905; 525/906; 106/20 R

[58] Field of Search ............... 526/281, 283, 284, 290, 526/237, 280; 528/396; 525/97, 98, 133, 185, 189; 106/20 R, 32

[56] References Cited

U.S. PATENT DOCUMENTS

| | | | |
|---|---|---|---|
| 1,741,473 | 12/1929 | Michel | 585/459 |
| 2,229,018 | 1/1941 | Smith et al. | 528/386 |
| 2,233,964 | 3/1941 | Smith et al. | 585/25 |
| 3,554,940 | 1/1971 | Arakawa et al. | 526/290 |
| 3,705,202 | 12/1972 | Massie | 585/446 |
| 3,987,123 | 10/1976 | Lepert | 525/290 |
| 4,102,834 | 7/1978 | Morimoto et al. | 526/283 |
| 4,105,843 | 8/1978 | Iwase et al. | 526/290 |
| 4,129,557 | 12/1978 | Kudo et al. | 526/283 |
| 4,255,297 | 3/1981 | Werner et al. | 525/185 |
| 4,533,700 | 8/1985 | Mizui et al. | 526/237 |
| 4,983,682 | 1/1991 | Badie et al. | 526/290 |
| 5,049,615 | 9/1991 | Chu et al. | 525/92 |
| 5,254,649 | 10/1993 | Miln et al. | 526/237 |

FOREIGN PATENT DOCUMENTS

| | | |
|---|---|---|
| 0063419 | 10/1982 | European Pat. Off. |
| 4038107 | 10/1974 | Japan . |
| 0116760 | 9/1981 | Japan . |
| 1043360 | 9/1966 | United Kingdom . |

OTHER PUBLICATIONS

Grant L. Hackh's "Chemical Dictionary", Fifth Ed. by Grant pp. 384, 557 & 558, McGraw-Hill, 1987.

*Primary Examiner*—Tae H. Yoon
*Attorney, Agent, or Firm*—Joanne W. Patterson

[57] ABSTRACT

The alkylation resins of this invention comprise the alkylation reaction product of (a) at least one substituted or unsubstituted polycyclic aromatic compound and (b) at least one ethylenically unsaturated hydrocarbon monomer having at least two carbon-carbon double bonds that reacts with the polycyclic aromatic compound by alkylation in the presence of an acid catalyst, wherein the ratio of (a) to (b) in the resin is about 1:9 to about 3:1 by weight. The resins have a weight average molecular weight of less than 10,000 measured by size exclusion chromatography, and a Ring & Ball softening point of about 50° to about 250° C. Because of their high softening point and low molecular weight, the resins are useful in a variety of applications such as flow rate modifiers for engineering polymers, tackifiers for adhesives, and flushing agents for inks.

83 Claims, 2 Drawing Sheets

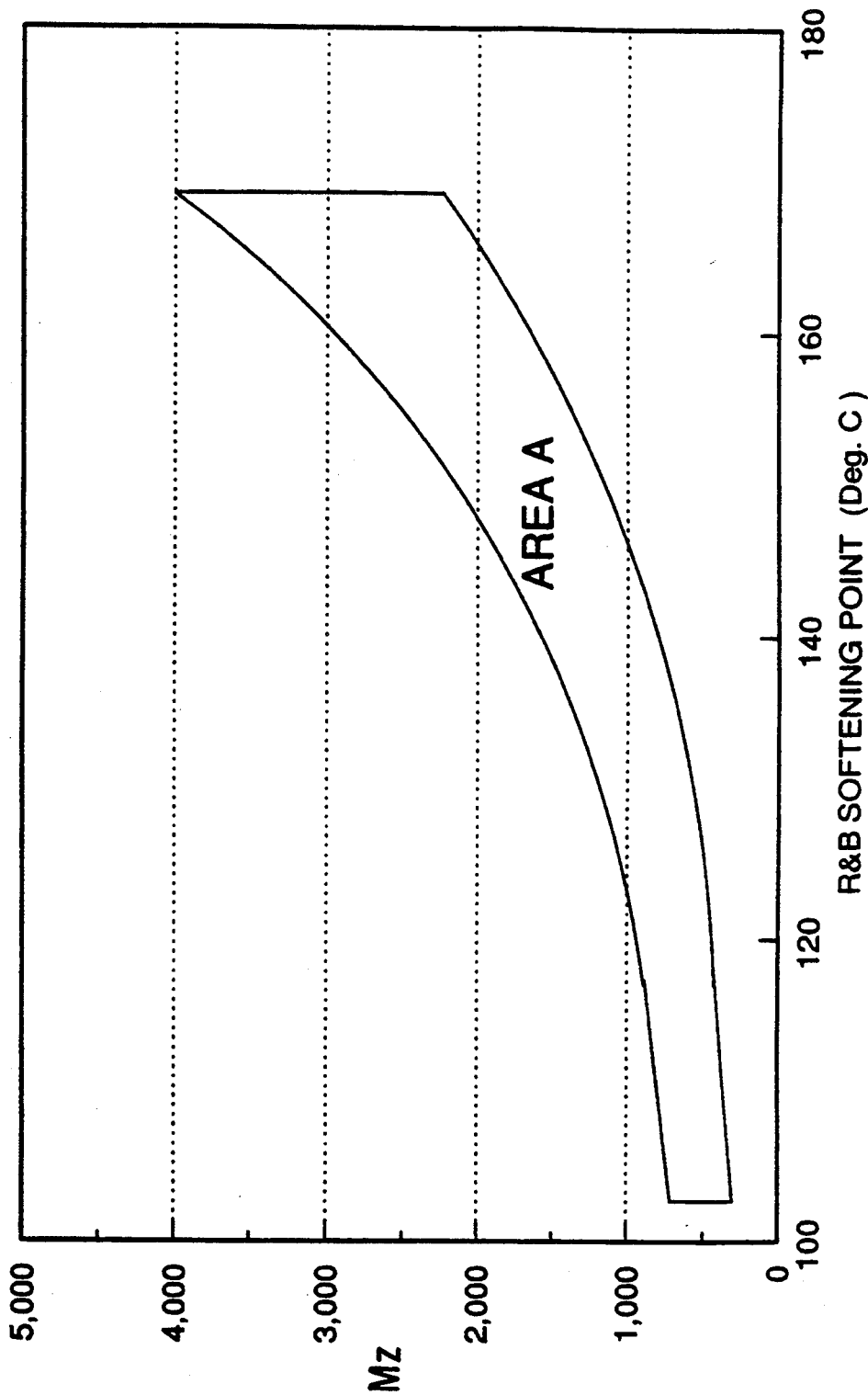

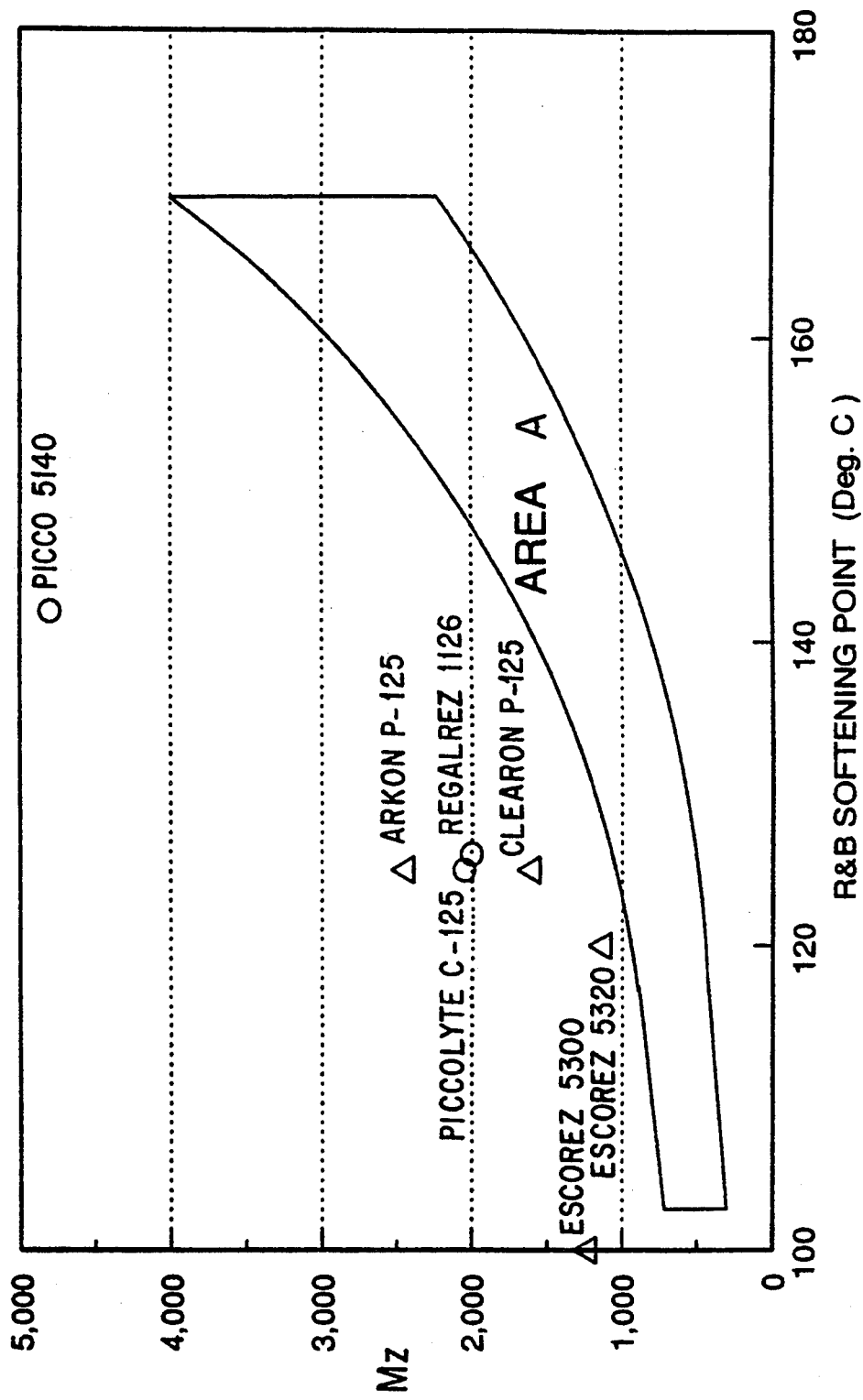

ALKYLATION RESINS FROM POLYCYCLIC AROMATIC COMPOUNDS

FIELD OF THE INVENTION

This invention relates to hydrocarbon resins made by the catalytic alkylation of an aromatic reaction solvent with an ethylenically unsaturated monomer.

BACKGROUND OF THE INVENTION

Alkylation of polycyclic aromatic compounds with monoolefins in the presence of an acid catalyst to produce a resinous product is disclosed in U.S. Pat. Nos. 2,229,018; 1,741,473 and 2,233,964.

Preparation of alkylation resins by reacting dicyclopentadiene (DCPD) with aromatic reaction solvents in the presence of a catalyst such as $AlCl_3$ is disclosed in U.S. Pat. No. 4,255,297. The solvents disclosed include alkylaromatic hydrocarbons and tetrahydronaphthalene. Alkylation of benzene aromatic compounds with mono- and polyolefins is disclosed in U.S. Pat. No. 3,705,202. A molybdenum-carbon monoxide compound is used as the catalyst.

Copolymers of an unsaturated cyclic hydrocarbon such as dicyclopentadiene and an aromatic compound such as naphthalene or anthracene are disclosed in United Kingdom Patent 1,043,360. The polymerization is carried out under oxidizing conditions, and the products are crystalline and have a melting point above 300° C.

SUMMARY OF THE INVENTION

The alkylation resins of this invention comprise the alkylation reaction product of (a) at least one substituted or unsubstituted polycyclic aromatic compound, and (b) at least one ethylenically unsaturated hydrocarbon monomer having at least two carbon-carbon double bonds that reacts with the polycyclic aromatic compound by alkylation in the presence of an acid catalyst, wherein the ratio of (a) to (b) in the resin is about 1:9 to about 3:1 by weight, the resin having a weight average molecular weight Mw of less than about 10,000 measured by size exclusion chromatography, and a Ring & Ball softening point of about 50° to about 250° C.

Also according to the invention, the resins are produced by reacting the ethylenically unsaturated hydrocarbon monomer and the polycyclic aromatic compound in the presence of an acid catalyst that promotes the alkylation of the polycyclic aromatic compound by the ethylenically unsaturated monomer. In a preferred embodiment of the invention, resins that are the reaction product of dicyclopentadiene and a naphthalenic aromatic compound have a z average molecular weight Mz measured by size exclusion chromatography and a Ring and Ball softening point in ° C. that falls within Area A of FIG. 1.

Also according to the invention, the resins of this invention can be used in adhesive and ink compositions and as modifiers for engineering polymers.

At the highest level of aromatic incorporation, the softening point of the resins of this invention made with polycyclic aromatic compounds is about 60° C. higher at an equivalent degree of polymerization than that of resins made with benzene aromatic compounds. The resin products of this invention therefore have a unique combination of properties, i.e., high softening point and low molecular weight.

BRIEF DESCRIPTION OF THE DRAWINGS

FIG. 1 shows the relationship of Mz, the z average molecular weight, to the Ring and Ball softening point for alkylation resins made from dicyclopentadiene (DCPD) and naphthalenic aromatic compounds. Resins from these monomers made according to the process of this invention have a z average molecular weight Mz and a R&B softening point that falls within Area A of FIG. 1.

FIG. 2 shows the relationship of Mz to the Ring and Ball softening point for the alkylation resins of this invention made from DCPD and naphthalenic aromatic compounds (Area A), compared to various resins that are currently available and are made from different monomers.

DETAILED DESCRIPTION OF THE INVENTION

The term "resin" as used in this specification refers to low molecular weight polymers having a Ring and Ball (R&B) softening point of at least 50° C., where softening point is measured by the ASTM E28-67 test procedure. The resins of this invention are essentially amorphous in character and have a Ring and Ball softening point of about 50° to about 250° C. The molecular weight is expressed as the weight average molecular weight (Mw) unless noted otherwise, and is less than about 10,000, preferably less than 5,000, and most preferably less than 3,000, measured by size exclusion chromatography.

The polycyclic aromatic compounds useful for forming the resins of this invention have two or more aromatic rings and include, for example, diphenyl, naphthalene, anthracene, biphenylene, acenaphthalene, fluorene, phenanthrene, and mixtures thereof. Polycyclic aromatic compounds with a fused ring system are preferred. Naphthalenic compounds are most preferred. The polycyclic aromatic compounds can be substituted with alkyl or cycloalkyl groups, or with polar functional groups, provided that the substituted compounds are alkylated during the resin-forming reaction and do not excessively inhibit the reaction. Suitable polar functional groups include, for example, hydroxy, alkoxy, carbalkoxy, and carboxy groups. The partially hydrogenated derivatives of any of these substituted polycyclic aromatic compounds, such as substituted tetrahydronaphthalene compounds, are also useful in the reaction. Naphthalene, alkyl-substituted naphthalenes, and mixtures thereof with alkyl-substituted tetrahydronaphthalenes are preferred. These preferred compounds are subsequently referred to as naphthalenic aromatic compounds. Examples of alkyl-substituted naphthalene compounds are alpha- or beta-monomethylnaphthalene, the various isomers of dimethyl- or trimethylnaphthalene, or other alkyl-substituted naphthalenes where the alkyl substituent can be, for example, methyl, ethyl, propyl, butyl or any combination thereof. Any combination of the polycyclic aromatic compounds mentioned above can also be used for preparing the resins of this invention.

Any unreacted polycyclic aromatic compound, which serves as the solvent for the reaction, is later removed to recover the resin product, typically by vacuum stripping or steam stripping. For this reason the more volatile polycyclic aromatic compounds, preferably those containing 15 carbon atoms or less, and most preferably those containing 13 carbon atoms or less, are generally used. Although the resins can be made from any of the pure polycyclic aromatic compounds described above, it is not required or preferred that a pure compound be used. Commercial polycyclic aromatic hydrocarbon feedstocks are generally used. One example of this type of feedstock is a mixture of various alkylnaphthalene compounds produced during the processing and refining of petroleum products. These compounds include a mixture of the various isomers of mono-, di-, and trimethylnaphthalene along with various alkyltetrahydronaphthalene isomers. The polycyclic aromatic compound can also be mixed with benzene aromatics. In the course of the reaction both the polycyclic aromatic compound and the benzene aromatic compound will be chemically incorporated into the resin, the amounts depending upon the relative amount of each type of aromatic compound in the mixture. The amount of each type of aromatic compound needed to produce the desired properties can readily be determined by one skilled in the art. Examples of useful benzene aromatic compounds are benzene, toluene, xylene, ethylbenzene, other alkyl-substituted benzenes, or any mixtures thereof.

Because of their commercial availability, diolefin monomers are the preferred ethylenically unsaturated monomers containing at least two carbon-carbon double bonds per molecule. The preferred class of diolefins used for making the resins of this invention comprises those diolefins that react primarily by alkylation of the polycyclic aromatic compound by each site of unsaturation in the diolefin monomer. Resins made from these monomers are alternating copolymers having a general $(A-B)_n-A$ structure, where A represents a polycyclic aromatic molecule and B is a monomer molecule. Preferred monomers that yield a resin of this type are those containing at least one cyclic olefin group, e.g., dicyclopentadiene, 4-vinyl-1-cyclohexene, 5-vinyl-2-norbornene, and 4-vinyl-1-methylcyclohexene. Dicyclopentadiene is most preferred. Monomers of this type selectively react by alkylation of the polycyclic aromatic compound rather than by vinyl polymerization through the double bond. In the above general copolymer structure the degree of polymerization (n) can be as low as 1, and a large amount of the product is comprised of two polycyclic aromatic molecules reacted with one monomer molecule. Resins with this low degree of polymerization surprisingly demonstrate a high softening point and useful resin properties despite their extremely low molecular weight.

The ratio of polycyclic aromatic compound to ethylenically unsaturated monomer in the resins of this invention is about 1:9 to about 3:1 by weight. The resins preferably contain at least 10% by weight of diolefins reacting primarily by alkylation, and are essentially amorphous materials, i.e., if any crystalline material is present, it is present at a very low level.

The resins of this invention are prepared by using acid catalysts that are known to cause alkylation of an aromatic solvent by an ethylenically unsaturated hydrocarbon monomer. Examples of acid catalysts useful for promoting the alkylation of polycyclic aromatic compounds by ethylenically unsaturated monomers include, for example, $AlCl_3$, $BF_3-H_3PO_4$, HF, $SnCl_4$, $AlCl_2-H_2PO_4$, $SbCl_5$, $ZnCl_2$ and acidic alumina. Lewis acids such as $AlCl_3$, $SnCl_4$, $SbCl_5$ and $ZnCl_2$ are preferred. $AlCl_3$ is particularly effective in forming the resins of this invention. A small amount of a cocatalyst such as acetic acid, HCl, water, ethanol, ethylene glycol, or another proton donor, in conjunction with $AlCl_3$ improves the efficiency of the reaction.

The reaction temperature used depends upon the activity of the particular catalyst that is used, but is generally in the range of about $-20°$ to about $150°$ C. When $AlCl_3$ is used as the catalyst, a suitable reaction temperature is typically about $20°$ to about $70°$ C. To get the highest softening point and yield, the alkylation reaction must proceed to completion, i.e., complete reaction of all carbon-carbon double bonds must occur. When DCPD is used as the ethylenically unsaturated hydrocarbon monomer, essentially 100% reaction of both carbon-carbon double bonds can be attained. The best results are obtained when (1) sufficient amounts of catalyst and cocatalyst are present to promote complete reaction, and (2) there are no impurities present in either the solvent or the monomer, which may deactivate the alkylation catalyst and lead to variable results. The alkylation of naphthalenic aromatic compounds with DCPD catalyzed by $AlCl_3$ proceeds at a very rapid rate. As a result, the reaction time is not critical. Little difference in results is observed when the rate of addition of the monomer is varied over a batch addition time period of 10-30 minutes. Other addition schemes can also be used.

When resins are formed by an alkylation reaction, the resin itself, along with the free solvent, can be alkylated to a higher molecular weight by the monomer. As the amount of polycyclic aromatic compound in the reaction mixture is reduced relative to the ethylenically unsaturated hydrocarbon monomer, the molecular weight and softening point of the product increase. Controlling the polycyclic aromatic/monomer ratio can therefore be used to control the molecular weight and softening point of the product.

The properties of the resins of this invention formed by alkylating polycyclic aromatic compounds are dramatically different from the properties of resins made by alkylating benzene aromatic compounds. When a resin with a Ring & Ball softening point higher than about $80°$ C. is made using the alkylation reaction of DCPD with alkylbenzene solvents, the molecular weight of the resin is too high and a product with an undesirably high melt viscosity, insufficient solubility in aliphatic solvents, and insufficient compatibility with aliphatic polymers is produced. The resins of this invention, however, exhibit a high softening point in combination with low molecular weight.

The resins of this invention can be made from a wide variety of ethylenically unsaturated hydrocarbon monomers and polycyclic aromatic compounds. However, in terms of commercial availability and reactivity with polycyclic aromatic compounds, some monomers are preferred over others. Dicyclopentadiene (DCPD) is particularly desirable for the practice of this invention because of its rigid cyclic structure, its reactivity, and its commercial availability. DCPD is a ten carbon diolefin that is typically formed as a byproduct when petroleum naphtha is cracked to form ethylene. DCPD is commercially available in numerous grades ranging from crude mixtures of DCPD with other olefin or diolefin materials to grades containing $99+\%$ DCPD. Grades containing the highest assay of DCPD ($\geq 97\%$) are preferred. However, commercial DCPD feedstocks containing lower DCPD levels, e.g., at least 90% DCPD, preferably at least 95% DCPD, can also be used in the resin-forming reaction.

Alkylation resins having higher softening points than that of resins made with untreated DCPD are obtained by using dicyclopentadiene that has been heat-treated under conditions that cause the DCPD to react and form higher molecular weight oligomers. This can be accomplished, for example, by heating DCPD under pressure in a closed system at about 190° C. for one to three hours, or by heating a 25% solution of DCPD in naphthalene for three hours at about 175° C. and then at about 185° C. for three hours under atmospheric nitrogen pressure. This procedure is known to crack DCPD to cyclopentadiene (CP), which in turn reacts with DCPD to form CP trimer (15 carbon atoms) and CP tetramer (20 carbon atoms) along with higher oligomers. Any chemically functional equivalent of cyclic diolefin oligomers can also be used. The term "chemically functional equivalent" means a large molecule formed by a Diels-Alder reaction that contains many rings and has a double bond at each end of the molecule, as in oligomers derived from dicyclopentadiene.

The Ring and Ball softening point of polymers made from DCPD and naphthalenic hydrocarbons ranges from about 100° C. to about 170° C., preferably about 110° C. to about 160° C., as the weight average molecular weight (Mw) measured by size exclusion chromatography (SEC) varies between about 350 and about 1000, and the z average molecular weight varies between 500 and 3000. Similar polymers made with alkylbenzene aromatic compounds in the same Mw range would have a softening point of about 50° to about 100° C.

Yields of greater than about 250%, typically 250–300%, are obtained in the alkylation of naphthalenic hydrocarbons with DCPD, where the yield is the amount of resin product recovered divided by the amount of DCPD reacted. The high yield demonstrates that most of the product consists of incorporated solvent. Typically a DCPD/naphthalenic alkylation product is comprised of about 40 to about 70% adducted naphthalenic solvent. These polymers have prominent aromatic characteristics and display mixed methylcyclohexane cloud point (MMAP) values in the range −10° to +10° C. MMAP is a test measuring the solubility of the polymer in a mixed aniline plus methylcyclohexane solvent. Low MMAP values indicate a highly aromatic polymer. Despite the high softening point and low MMAP values for these resins, they surprisingly demonstrate good solubility in a variety of aliphatic solvents and fair-to-good compatibility with a variety of aliphatic polymers.

When the alkylation resins of this invention are made by the reaction of DCPD and a naphthalenic aromatic compound, the z average molecular weight Mz is about 500 to about 3,000. Mz is a third order distribution defined as $$\frac{\Sigma N_i M_i^3}{\Sigma N_i M_i^2},$$

as described in *Principles of Polymer Systems* by Ferdinand Rodriguez, McGraw-Hill, 1992. N is the number of polymer chains having a specified molecular weight i, M is the molecular weight of i, and i is a species having a specified molecular weight. The relationship between Mz measured by size exclusion chromatography and the Ring and Ball softening point for these resins is shown in FIG. 1. The resins have properties that fall within Area A. A comparison of the properties of resins made from DCPD and naphthalenic aromatic compounds and other currently available resins made from other types of monomers is found in FIG. 2. PICCO® 5140 aromatic hydrocarbon resin, PICCOLYTE® C-125 terpene hydrocarbon resin, and REGALREZ® 1126 hydrogenated aromatic hydrocarbon resin are available from Hercules Incorporated, Wilmington, Del. ARKON P-125 hydrogenated C9 resin is available from Arakawa Chemical USA, Chicago, Ill. CLEARON P-125 hydrogenated terpene resin is available from Yashuhara Yushi Co., Japan. ESCOREZ 5300 and 5220 hydrocarbon resins are available from Exxon Chemical, Houston, Tex.

The DCPD/naphthalenic alkylation resins of this invention have good compatibility with aliphatic compounds or polymers. The OMS cloud point (indicating the solubility of the resin in odorless mineral spirits) of these resins ranges from about 20° to about 175° C. (the lower softening point DCPD/naphthalene resins have lower OMS cloud point values). Lower cloud point values indicate better aliphatic compatibility. A value of −50° C. or less indicates a polymer with excellent aliphatic compatibility.

In many applications, such as modifiers for nonpolar aliphatic adhesive polymers, the very high softening point and high aromatic content of resins made from polycyclic aromatic compounds and unsaturated monomers reacting primarily by alkylation are not needed, but better aliphatic compatibility is required. The compatibility of these resins with aliphatic compounds and polymers can be greatly improved by alkylating a naphthalenic aromatic compound with a mixture of the unsaturated monomer reacting primarily by alkylation and a second monomer. These mixtures of monomers preferably contain at least 10% by weight of unsaturated monomers that react primarily by alkylation. The second comonomer can be a diolefin that reacts primarily by vinyl polymerization, e.g., piperylene concentrate, isoprene, butadiene, and 1,3-hexadiene, or a monoolefin such as dihydrodicyclopentadiene, cyclopentene, and norbornene. Increasing the level of monoolefin, or diolefin reacting primarily by vinyl polymerization, reduces the amount of incorporated polycyclic aromatic compound and the R&B softening point of the product, but also improves the aliphatic compatibility of the resin. An excellent comonomer is a C-5 diolefin feedstock high in cis- and trans-piperylene content, subsequently referred to as "piperylene concentrate" (PC). Low levels of added piperylene concentrate greatly reduce odorless mineral spirits (OMS) cloud point. A resin made from a naphthalenic aromatic compound and a 75/25 DCPD/piperylene concentrate mixture, for example, produces a resin with a significant level of adducted naphthalenic aromatic compound and an OMS cloud point below −65° C. These resins typically have a Ring and Ball softening point of about 50° to about 150° C., most preferably about 80° to about 120° C.

Because of their strongly aromatic character and high softening point, the alkylation resins of this invention are useful as flow modifiers for synthetic polymers that have a heat deflection or continuous use temperature of greater than about 100° C., preferably greater than about 150° C. Heat deflection temperature is determined using the ASTM D-648-82 (Rev. 88) procedure. The continuous use temperature is determined by mechanical analysis and is defined as the temperature at which the material can be used continuously without failure under the desired operating conditions. The continuous use temperature is generally slightly lower than the heat deflection temperature. These synthetic polymers will subsequently be referred to as "engineering polymers". Examples of such polymers include, for example, polyether polysulfone, acrylonitrile/butadiene/styrene copolymers, nylon 6, nylon 66, polyphenylene ether, polysulfone and polycarbonate polymers. Because of their low molecular weight, the alkylation resins can be added to such polymers to reduce the melt viscosity and improve the flow of the material. Adding a low molecular weight resin as a flow modifier also reduces the glass transition temperature or thermal resistance of the polymer. However, this negative effect is minimized because of the high softening point that can be achieved with this type of alkylation resin. The resins of this invention can also be used to modify other properties of engineering polymers, such as, for example, modulus, glass transition temperature, hardness, and water vapor transmission rate.

The alkylation resins of this invention made from unsaturated monomers reacting primarily by alkylation with polycyclic aromatic compounds can be used as ingredients in ink products, e.g., as flushing agents, where a solution of resin in an ink oil is used for producing a dispersion of water-wet pigment in the resin/ink oil solution. In this application the resin must cause the water to separate from the pigment surface so that water can be decanted off, and it must also show affinity for the surface of the pigment to form a good dispersion and produce good ink properties. The resins of this invention are useful in ink flushing applications because of their good solubility in ink oils, their aromatic character, and their high softening point. The resins can also be used as binders and film-formers in ink formulations.

The alkylation resins of this invention made from unsaturated monomers reacting primarily by alkylation with polycyclic aromatic compounds are also useful as adhesive tackifying resins because of their low molecular weight. Because of their aromatic character, these resins are more suited for tackifying the more polar adhesive polymers such as ethylene/vinyl acetate. However, these resins can be modified, e.g., by hydrogenation or by using as a coreactant an aliphatic monomer such as piperylene concentrate that increases the aliphatic character of the resin. Such a modification will make the resins more generally useful as tackifiers for polymers such as natural rubber, styrene-isoprene or styrene-butadiene block copolymers, and polybutadiene.

The resins of this invention can be hydrogenated to various degrees, leaving various levels of aromaticity in the hydrogenated resin. The polycyclic aromatic units can be fully hydrogenated to yield fully saturated units, e.g., decahydronaphthalene units, or they can be partially hydrogenated to form, for example, tetrahydronaphthalene moieties. Palladium supported on carbon was found to be an excellent catalyst for achieving the hydrogenation of the polycyclic aromatic units of the resins of this invention, although other catalysts commonly used for hydrogenating aromatic materials can be used. Examples of other catalysts are noble metal catalysts and Ni-based catalysts. A Ni catalyst supported on silica (XTC-400 supplied by Crosfield Catalysts, Warrington, Cheshire, England) was also found to be effective for hydrogenating the resins of this invention.

In the following examples, OMSCP means odorless mineral spirits cloud point, which is determined by the following procedure. Ten weight percent resin is mixed in a test tube with SHELL-SOL 71 odorless mineral spirits, available from Shell Chemical, Houston, Tex. The test tube is then heated until a clear solution is formed. The solution is cooled until turbidity is obtained. The onset of initial turbidity is recorded as the initial cloud point. Cooling of the test tube is continued until visibility is totally obstructed. The final cloud point is recorded at the point of no visibility.

MMAP is the mixed methylcyclohexane aniline cloud point, which is determined using a modified ASTM D 611-82 procedure. Methylcyclohexane is substituted for the heptane used in the standard test procedure. The procedure uses resin/aniline/methylcyclohexane in a ratio of 1/2/1 (5 g/10 ml/5 ml) and the cloud point is determined by cooling a heated, clear blend of the three components until complete turbidity just occurs.

R&B softening point is the Ring and Ball softening point, determined according to ASTM E28-67.

To determine Gardner color, 50 wt. % resin is mixed with reagent grade toluene at room temperature until it dissolves. The color of the resin solution is compared to a set of standards on a Gardner Delta Color Comparator, available from Pacific Scientific, Bethesda, Md. The color values range from 1 to 18, with 18 being the darkest.

In this specification all parts and percentages are by weight unless otherwise noted.

EXAMPLE 1

Examples 1–3 compare the properties of alkylation resins made from dicyclopentadiene and a mixture of naphthalenic aromatic compounds, a mixture of naphthalenic and benzene aromatic compounds, and benzene aromatic compounds alone, using a batch process.

SURE-SOL 205 (800 parts) was mixed under nitrogen with 1.2 parts of an acetic acid cocatalyst and 6.0 parts of anhydrous AlCl$_3$. SURE-SOL 205 is a mixed alkylnaphthalene solvent available from Koch Chemical Co., Corpus Christi, Tex. After the catalyst formed a uniform mixture, a solution consisting of 100 parts of dicyclopentadiene (DCPD) and 100 parts of SURE-SOL 205 was added by drops over a 30 minute period. The DCPD used was 95% DCPD and 5% miscellaneous codimers of cyclopentadiene with other C5 olefins, available as DCPD 108 from Lyondell Petrochemical Co., Houston, Tex.

The reaction was held at 42° C. during monomer addition, and after all of the DCPD was added, the reaction mixture was held an additional 15 minutes at the reaction temperature. The reaction mixture was then diluted, washed three times with water to remove AlCl$_3$ catalyst, filtered, and stripped to remove volatile solvent. The properties of the resin product are given in Table 1.

EXAMPLE 2

An alkylation resin was prepared as described in Example 1, except that a solvent mixture consisting of 500 parts of xylene (mixed isomers) and 330 parts of SURE-SOL 205 was substituted for the 900 parts of SURE-SOL 205 used in Example 1. The properties of the resin product are given in Table 1.

COMPARATIVE EXAMPLE 3

An alkylation resin was prepared as described in Example 1, except that 830 parts of xylene was used as the alkylation solvent. The properties of the resin product are given in Table 1. The results showed that a large proportion of the resin was derived from incorporated aromatic solvent. When SURE-SOL 205 alkylnaphthalene solvent was used, a resin was formed in higher yield with a higher R&B softening point. As the amount of xylene was increased, the naphthalene groups in the resin were replaced with alkylbenzene groups, and the yield and softening point decreased. At the same time, aliphatic solvent compatibility improved due to the reduction of the aromatic content of the resin.

TABLE 1

|  | Example 1 | Example 2 | Comparative Example 3 |
|---|---|---|---|
| SURE-SOL 205 | 900 | 330 | — |
| Xylene | — | 500 | 830 |
| Acetic acid | 1.2 | 1.2 | 1.2 |
| $AlCl_3$ | 6.0 | 6.0 | 6.0 |
| DCPD | 100 | 100 | 100 |
| Reaction Temp. (°C.) | 42 | 40 | 42 |
| Yield (% of DCPD) | 292 | 240 | 221 |
| Adducted Solvent (% of resin) | 66 | 58 | 55 |
| Mw | <1000 | <1000 | <1000 |
| R&B Soft. Pt. (°C.) | 119 | 95 | 49 |
| OMSCP (Full Cloud) (°C.) | 26 | −9 | <−60 |
| Gardner color | 9 | 8 | 7 |

EXAMPLE 4

Examples 4–6 describe the preparation of alkylation resins from dicyclopentadiene (DCPD) and a mixture of naphthalenic aromatic compounds using various ratios of solvent to DCPD.

A resin was prepared as described in Example 1. The ratio of solvent to DCPD in the reaction mixture was 9:1. The properties of the resin are given in Table 2.

EXAMPLE 5

A resin was prepared as described in Example 1, except that the amount of solvent was reduced to a level of 500 parts of SURE-SOL 205 mixed alkylnaphthalene solvent to 100 parts of DCPD. The properties of the resin are given in Table 2.

EXAMPLE 6

A resin was prepared as described in Example 1, except that the amount of solvent was reduced to 400 parts of SURE-SOL 205 mixed alkylnaphthalene solvent to 100 parts of DCPD, and 60 parts of mineral spirits were added as an inert diluent. The properties of the resin are given in Table 2.

As the amount of naphthalene solvent was reduced, the resin that formed was alkylated to a higher degree by additional DCPD, increasing the molecular weight and softening point.

TABLE 2

|  | Example 4 | Example 5 | Example 6 |
|---|---|---|---|
| SURE-SOL 205 | 900 | 500 | 400 |
| Acetic acid | 1.2 | 1.1 | 0.9 |
| $AlCl_3$ | 6.0 | 6.0 | 6.0 |
| DCPD | 100 | 100 | 100 |
| Reaction Temp. (°C.) | 42 | 45 | 42 |
| Solvent/DCPD ratio | 9/1 | 5/1 | 4/1 |
| Yield (% of DCPD) | 290 | 263 | 259 |
| Adducted Solvent (% of resin) | 66 | 62 | 61 |
| Molecular Weight by SEC |  |  |  |
| Mn | 331 | 346 | 431 |
| Mw | 437 | 595 | 753 |
| Mz | 657 | 1103 | 1724 |
| R&B Soft. Pt. (°C.) | 118 | 136 | 148 |
| OMSCP (Full Cloud) (°C.) | 29 | 115 | ≧170 |
| Gardner color | 9 | 11 | 11 |

EXAMPLE 7

A resin was prepared as described in Example 5 using DCPD that was >99% pure and crystalline in character. As a comparison, a resin having a 136° C. R&B softening point was prepared as described in Example 5 using Lyondell 108 DCPD (95% pure monomer). The properties of the two resins are compared in Table 3.

Using the high purity DCPD increased the R&B softening point by 3° C. and increased yield slightly. The amount of catalyst needed to achieve these high softening points was less when pure DCPD was used, since the codimers in the Lyondell 108 DCPD influence and deactivate the $AlCl_3$ catalyst more than DCPD alone.

TABLE 3

|  | Example 5 | Example 7 |
|---|---|---|
| SURE-SOL 205 | 500 | 500 |
| Acetic acid | 1.1 | 0.9 |
| $AlCl_3$ | 6.0 | 4.5 |
| DCPD (>99% pure) | — | 100 |
| DCPD (Lyondell 108, 95% pure) | 100 | — |
| Solvent/DCPD ratio | 5/1 | 5/1 |
| Reaction Temp. (°C.) | 45 | 45 |
| Yield (% of DCPD) | 263 | 275 |
| Adducted Solvent (% of resin) | 62 | 64 |
| Mw | 595 | ~600 |
| R&B Soft. Pt. (°C.) | 136 | 139 |
| OMSCP (Full Cloud) (°C.) | 115 | 133 |
| Gardner color | 11 | 7+ |
| Chlorine (by X-ray) | 30 | 50 |

EXAMPLE 8

Examples 8 and 9 compare the properties of alkylation resins made from 99% DCPD, with and without thermal oligomerization of the DCPD.

A resin was made according to the procedure described in Examples 4–6, except that 99% pure DCPD was used, and the SURE-SOL 205 mixed alkylnaphthalene solvent to DCPD ratio was reduced to 3.5/1. In this reaction mineral spirits was added as an inert diluent to reduce the viscosity of the reaction mixture. This procedure produced a resin with a 159° C. R&B softening point having a z average molecular weight Mz of 2607 measured by size exclusion chromatography (SEC). The properties of the resin are shown in Table 4.

EXAMPLE 9

The monomer solution consisted of a 75% SURE-SOL 205 mixed alkylnaphthalene solvent and 25% DCPD (99% pure) mixture, which had been heated for 3 hours at 175° C. and then 3 hours at 185° C. under atmospheric nitrogen pressure. This procedure is known to crack DCPD to cyclopentadiene (CP), which in turn reacts with DCPD to form CP trimer (15 carbon atoms) and CP tetramer (20 carbon atoms) along with higher oligomers. This solution of DCPD and CP oligomers was reacted with SURE-SOL 205 using $AlCl_3$ as a catalyst. The final ratio of SURE-SOL 205 to monomer was approximately 4.3/1. A high softening point resin was produced in good yield. The properties of the resin are listed in Table 4.

The product made in Example 9 had a higher softening point and lower molecular weight (Mz) than the product of Example 8 because the average molecular weight of the heat-treated DCPD monomer was higher than the molecular weight of DCPD itself. As a result, the molecular weight of the lowest molecular weight component of the resin product, namely the component consisting of 2 solvent molecules reacted with 1 monomer, was greater using heat-treated DCPD.

TABLE 4

|  | Example 8 | Example 9 |
|---|---|---|
| SURE-SOL 205 | 350 | 440 |
| Mineral spirits | 50 | — |
| Acetic acid | 0.7 | 0.7 |
| $AlCl_3$ | 3.3 | 3.3 |
| DCPD (99% pure) | 100 | 0 |
| Heat-treated DCPD | 0 | 100 |
| Reaction Temp. (°C.) | 35 | ~60 |
| Yield (% of DCPD) | 254 | 205 |
| Adducted Solvent (% of resin) | 61 | 51 |
| R&B Soft. Pt. (°C.) | 159 | 165 |
| OMSCP (Full Cloud) (°C.) | >175 | >175 |
| Gardner color | 7 | 8 |
| Molecular Weight by SEC |  |  |
| Mn | 471 | 432 |
| Mw | 882 | 677 |
| Mz | 2607 | 1392 | ratio used in Example 10. The properties of the resin are given in Table 5.

EXAMPLE 12

A resin was prepared as described in Example 10, except that 5-vinyl-2-norbornene was used as the monomer at a SURE-SOL 205 mixed alkylnaphthalene solvent to monomer ratio of 10/1. This is the same molar ratio used in Examples 10 and 11. The properties of the resin are given in Table 5.

COMPARATIVE EXAMPLE 13

A resin was prepared as described in Example 10, except that 1,5-hexadiene was used as the monomer at a SURE-SOL 205 mixed alkylnaphthalene solvent to monomer ratio of 11:1. This is similar to the molar ratio used in Examples 10-12. The properties of the resin are given in Table 5. Only a slight exotherm was observed and a small amount of product was recovered. Linear diolefins do not appear to alkylate naphthalene solvents as effectively as cyclic diolefins.

The yield and softening point of the resins derived from these other diolefin monomers were lower than the values measured for DCPD-derived products because the noncyclic double bond in these diolefins did not alkylate solvent as effectively as cyclic olefin groups, and the linear group from the noncyclic olefin bond in the resin molecule also made the resin structure more flexible. The resins derived from the diolefin monomers in Examples 11 to 13 had a lower OMSCP than the resin prepared in Example 10, indicating that the resins had better aliphatic compatibility than DCPD-derived resins, and would be useful in applications where good miscibility with nonpolar solvents or polymers is required.

TABLE 5

|  | Example 10 | Example 11 | Example 12 | Comparative Example 13 |
|---|---|---|---|---|
| SURE-SOL 205 | 900 | 1100 | 1000 | 1100 |
| Acetic acid | 1.2 | 1.2 | 1.2 | 1.6 |
| $AlCl_3$ | 6.0 | 6.0 | 6.0 | 12.0 |
| Reaction Temp. (°C.) | 42 | 42 | 42 | 30 |
| Monomer | 100 parts DCPD | 100 parts 4-Vinyl-1-cyclohexene | 100 parts 5-Vinyl-2-norbornene | 100 parts 1,5-Hexadiene |
| Mw | <500 | <500 | <500 | <1000 |
| Yield, % | 290 | 182 | 178 | ~10 |
| R&B Soft. Pt. (°C.) | 119 | 70 | 85 | oil |
| OMSCP (Full Cloud) (°C.) | 26 | <−50 | <−50 | <−50 |

EXAMPLE 10

Examples 10-13 compare the properties of alkylation resins made by the reaction of a mixture of naphthalenic aromatic compounds and various diolefins that react primarily by alkylation.

A resin was prepared as described in Example 1, using a ratio of SURE-SOL 205 mixed alkylnaphthalene solvent to DCPD of 9/1. A product having a 119° C. R&B softening point was obtained in 290% yield, based on DCPD. The properties of the resin are given in Table 5.

EXAMPLE 11

A resin was prepared as described in Example 10, except that 4-vinyl-1-cyclohexene was used as the monomer at a SURE-SOL 205 mixed alkylnaphthalene solvent to monomer ratio of 11/1. This is the same molar

EXAMPLE 14

Examples 14-17 compare the properties of an alkylation resin made from a mixture of naphthalenic aromatic compounds and a mixture of DCPD and piperylene concentrate, using various solvent/monomer ratios. The properties were compared to those of the resin prepared in Example 6, where the resin was made using only DCPD at a 4:1 solvent to monomer ratio.

A mixture of DCPD and piperylene concentrate (PC) was reacted with SURE-SOL 205 mixed alkylnaphthalene solvent using the procedure described in Example 6. The piperylene concentrate is available from Lyondell Petrochemical Co., Houston, Tex, and contained 58% cis- and trans-piperylene, 15% 2-methyl-2-butene, 13% cyclopentene, and other miscellaneous alkanes and alkenes. The monomer was added by drops over a time period of approximately 15 minutes to a mixture of SURE-SOL 205 mixed alkylnaphthalene solvent and catalyst with stirring. Incorporation of PC reduced the amount of solvent incorporated into the resin and reduced the softening point of the product. Incorporation of PC also greatly reduced the aromatic character of the resin and improved its aliphatic compatibility (lower OMSCP value). The properties of the resin are given in Table 6.

EXAMPLE 15

A resin was prepared as described in Example 14, except the level of SURE-SOL 205 mixed alkylnaphthalene solvent was reduced to a 2.4/1 solvent to monomer ratio (see Table 6). Reducing the solvent level increased the molecular weight, R&B softening point, and MMAP.

EXAMPLE 16

A resin was prepared as described in Example 15, except that the level of SURE-SOL 205 mixed alkylnaphthalene solvent was further reduced to a 1.9/1 solvent to monomer ratio (see Table 6). Reducing the solvent to monomer ratio increased the molecular weight, softening point, and MMAP without a deterioration in the aliphatic compatibility or OMSCP of the resin.

EXAMPLE 17

A resin product was made according to the procedure used in Examples 14 to 17. In this example the amount of piperylene concentrate, relative to DCPD, was increased. The properties of the resin listed in Table 6 show that increasing the amount of piperylene concentrate reduces the aromatic character of the resin as indicated by the higher MMAP value.

EXAMPLE 18

Examples 18 and 19 illustrate how a monoolefin monomer will affect the properties of the resin product when the ethylenically unsaturated monomer is a mixture of a diolefin reacting primarily by alkylation (DCPD) and a monoolefin. The monoolefin used is dihydrodicyclopentadiene, which was made by catalytic hydrogenation of the endomethylene double bond (norbornene-type double bond) of DCPD using standard methods known in the art. This catalytic hydrogenation selectively reduces the more active endomethylene double bond, leaving the less reactive cyclopentene-type double bond for further reaction.

A mixture of 120 g of SURE-SOL 205, 0.3 g of acetic acid and 2.5 g of anhydrous $AlCl_3$ was combined with stirring in a nitrogen-purged flask. A monomer solution consisting of 60 g of dihydrodicyclopentadiene, 15 g of DCPD, 0.3 g of acetic acid, and 60 g of SURE-SOL 205 was added by drops to the reaction over a period of 15 minutes at 45° C. After half of the monomer was added, an additional 2.5 g of $AlCl_3$ was charged to the reactor, before the second half of the monomer was added. The material balance and the properties of the resin that was formed are given in Table 7.

EXAMPLE 19

A resin was made according to the procedure described in Example 18, except that the monomer solution consisted of 50 g of dihydrodicyclopentadiene, 25 g of DCPD, 0.3 g of acetic acid and 60 g of SURE-SOL 205. The properties of the resin that was formed are listed in Table 7.

The properties of the resins prepared in this and the previous example are compared in Table 7 with a DCPD 10 alkylation resin made as described in Example 1. Substituting the monoolefin, dihydrodicyclopentadiene, greatly reduced the amount of naphthalene solvent incorporated through alkylation. As a result, the overall yield, Ring & Ball softening point and OMS cloud point greatly decreased. For many applications, good aliphatic compatibility, as indicated by a low OMSCP, is desired. Adding a monoolefin is one way to achieve this goal.

TABLE 6

|  | Example 6 | Example 14 | Example 15 | Example 16 | Example 17 |
|---|---|---|---|---|---|
| SURE-SOL 205 | 400 | 470 | 330 | 260 | 130 |
| Acetic acid | 0.9 | 1.1 | 0.9 | 0.8 | — |
| $AlCl_3$ | 6.0 | 5.3 | 4.7 | 4.0 | 2.2 |
| Piperylene Concentrate | — | 40 | 40 | 40 | 74 |
| DCPD | 100 | 100 | 100 | 100 | 100 |
| Solvent/Monomer Ratio | 4.0 | 3.4 | 2.4 | 1.9 | 0.75 |
| Reaction Temp. (°C.) | 42 | 35 | 35 | 35 | 40 |
| Yield (% of monomer) | 259 | 140 | 127 | 120 | 95 |
| Aliphatic H/Aromatic H (Ratio by Proton NMR) |  | 100/20 | 100/16 |  |  |
| Molecular Weight By SEC |  |  |  |  |  |
| Mn | 431 | — | 324 | 356 | 419 |
| Mw | 753 | ~700 | 627 | 749 | 1130 |
| Mz | 1724 | — | 1306 | 2611 | 2813 |
| R&B Soft. Pt. (°C.) | 148 | 89 | 93 | 99 | 101 |
| OMSCP (Full Cloud) (°C.) | >175 | <−60 | <−60 | <−60 | <−50 |
| MMAP (°C.) | 5 | 17 | 23 | 27 | 47 |
| Gardner color | 11 | 7 | 7 | 7 | 7 |

TABLE 7

|  | Example 18 | Example 19 | Example 1 |
|---|---|---|---|
| SURE-SOL 205 | 180 | 180 | 180 |
| $AlCl_3$/HOAC | 5/0.6 | 5/0.6 | 1.2/0.22 |
| DCPD | 15 | 25 | 20 |
| Dihydro DCPD | 60 | 50 | — |
| SURE-SOL 205/monomer | 2.4/1 | 2.4/1 | 9/1 |
| Aliphatic/aromatic $^1H$ ratio by NMR | 5/1 | 4.4/1 | 2.6/1 |
| % SURE-SOL 205 in product (% of resin) | 38 | 42 | 66 |
| R&B Softening Point (°C.) | 85 | 96 | 119 |
| Mw | <1000 | <1000 | <1000 |
| OMS Cloud Point 1st haze/fun cloud (°C.) | <−60/ <−60 | −15/−21 | 34/26 |

COMPARATIVE EXAMPLE 20

Examples 20-22 compare the melt flow rate of an unmodified polyphenylene ether engineering polymer with the flow rate of polyphenylene ether modified with a C9 hydrocarbon resin, and with an alkylation resin made by the process of this invention from dicyclopentadiene and a mixture of naphthalenic aromatic compounds.

The melt flow rate of a sample of NORYL ® N-300 polyphenylene ether (PPO) available from GE Plastics, Selkirk, N.Y., was measured at 280° C. using a 10 kg load according to ASTM D-1238-90b. A value of 8.0 g/10 min polymer flow was obtained (see Table 8).

COMPARATIVE EXAMPLE 21

Eight % by weight PICCO ® 5140 hydrocarbon resin available from Hercules Incorporated, Wilmington, Del., was melt compounded with the NORYL ® N-300 and the melt flow rate of the mixture was measured. PICCO ® 5140 hydrocarbon resin is made from C9 hydrocarbons and dicyclopentadiene. The melt flow increased to 14.3 g/10 min (see Table 8). This level of increase is typically observed when a hydrocarbon resin is used to modify the flow rate of the NORYL ® -N-300 polyphenylene ether.

EXAMPLE 22

A hydrocarbon resin having a R&B softening point of 120° C. was made from 99% pure dicyclopentadiene and SURE-SOL 205 mixed alkylnaphthalene solvent according to the procedure described in Example 1. This hydrocarbon resin was melt compounded with NORYL ® N-300 polyphenylene ether and the melt flow rate was measured. A melt flow rate of 23 grams/10 min was obtained, demonstrating that this low molecular weight resin was an extremely effective flow modifier for polyphenylene ether polymers (see Table 8).

TABLE 8

| | Comparative Example 20 | Comparative Example 21 | Example 22 |
|---|---|---|---|
| NORYL N-300 PPO | 100 | 92 | 92 |
| Flow Modifier (wt. %) | — | 8 | — |
| PICCO ® 5140 hydrocarbon resin | | | |
| DCPD/Alkylnaphthalene resin | — | — | 8 |
| Melt Flow Rate (g/10 min) | 8.0 | 14.3 | 23.0 |

EXAMPLE 23

Examples 23 and 24 compare the performance of an ink flushing vehicle made from a C9 hydrocarbon resin, and an alkylation resin made by the process of this invention from DCPD and a mixture of naphthalenic aromatic compounds.

Resins prepared by the reaction of DCPD and naphthalenic aromatic compounds can be used in pigment flushing vehicles used to separate and disperse pigment from pigment presscake. The pigment flushing procedure uses a resin based vehicle, such as a hydrocarbon resin in high boiling petroleum distillate solvent (ink oil). The vehicle is mixed with pigment presscake containing approximately 40% pigment in water. Because pigment is more compatible with the resin/oil vehicle than with water, the water is separated or "flushed" from the pigment surface, forming a dispersion of pigment in the resin/oil vehicle. Improving water separation and achieving better pigment dispersion gives stronger colors for a given concentration of pigment.

A resin having a Ring and Ball softening point of 150° C. was prepared as described in Example 6 by reacting DCPD in SURE-SOL 205 mixed alkylnaphthalene solvent at a 4/1 solvent to DCPD ratio. The resin was dissolved in MAGIESOL 47 ink oil (available from Magie Brothers, Franklin Park, Ill. at a 60% concentration and this vehicle was tested for its ability to flush pigment presscake. The flush vehicle was incrementally mixed with red pigment presscake using a sigma blade mixer. As water separated out after each addition of flush vehicle, it was decanted off before addition of more vehicle. This flushing vehicle caused ~85% of the pigment water to separate out, and the rate at which the water separated was rapid. The pigment dispersion was drawn down and had a high tint strength and extremely high gloss (see Table 9).

COMPARATIVE EXAMPLE 24

A resin flush vehicle was prepared using a 140° C. softening point C9 hydrocarbon resin. It is generally acknowledged that resins of this type have excellent pigment flushing properties. During pigment flushing tests with the same pigment as in Example 23, water break was achieved, but at a substantially slower rate than in Example 23. Good water removal was achieved, about 80% of the water on pigment, but the amount of water removed was less than in Example 23. The drawdown from the flush vehicle had lower gloss than in Example 23, and a higher pigment loading was required (31%) to achieve the same tint strength as in Example 23 (29% pigment loading) (see Table 9).

Overall the DCPD/naphthalenic aromatic resin prepared according to Example 6 gave faster water break, more complete water removal, stronger tint strength, and higher gloss coatings than pigment flush vehicles based on C9 hydrocarbon resins conventionally used for pigment flushing applications.

TABLE 9

| | Example 23 | Comparative Example 24 |
|---|---|---|
| Rate of Water Break | Very fast | Fast |
| Amount of Water Removed (%) | ~85 | ~80 |
| Required Pigment Loading (to achieve desired tint strength) (%) | 29 | 31 |
| Gloss | High gloss | Low gloss |

EXAMPLE 25

This example describes the hydrogenation of a DCPD/naphthalene alkylation resin to increase its aliphatic character.

A resin was prepared by reacting DCPD (99% pure) with SURE-SOL 205 mixed alkylnaphthalene solvent according to the procedure described in Example 1. The SURE-SOL 205 mixed alkylnaphthalene solvent amount was increased so that the ratio of SURE-SOL 205 to DCPD used in this reaction was 11/1. The properties of the resin are listed in Table 10. Using such a high solvent level produced a 120° C. softening point resin having a very low molecular weight and narrow molecular weight distribution.

The resin was then dissolved in a saturated aliphatic solvent at a 50% solids level for hydrogenation. This sample was placed in an autoclave along with a 5% palladium-on-carbon catalyst (Englehard 35926) at a level of 3.9 parts of catalyst per 100 parts of resin solids in the reactor. Engelhard 35926 is available from Engelhard Corporation, Chemical Catalyst Group, Iselin, N.J. The reactor and its contents were heated to 180° C. under 1000 psi hydrogen pressure and the reactor contents were stirred while maintaining a 1000-1200 psi hydrogen head pressure in the reactor at 180° C. The pressurized hydrogen gas was stirred into the reaction mixture for 7 hours, after which the decrease in hydrogen reactor pressure became minimal, indicating no further hydrogen uptake was occurring. The catalyst was filtered out of the hydrogenated resin solution and the resin was recovered by stripping off the aliphatic reaction solvent using a steam sparge at 230° C. until less than 1 cc of organic material per 50 cc of condensed steam was observed.

The properties of the hydrogenated resin that was formed and the properties of the aromatic precursor resin are listed in Table 10. During hydrogenation, the naphthalene units in the resin are hydrogenated to form saturated aliphatic units. This change can be observed by $^1$H NMR, which shows a marked increase in the aliphatic/aromatic proton area ratio, demonstrating that the aromatic rings were hydrogenated. From proton NMR it was estimated that ~85% of the original aromatic groups in the starting resin were hydrogenated. Hydrogenating the resin dramatically lightened the color of the resin and increased its aliphatic character.

TABLE 10

|  | Non-Hydrogenated Resin | Hydrogenated Resin |
|---|---|---|
| R&B Soft. Pt. (°C.) | 120 | 108 |
| Gardner Color | 5+ | 1 |
| OMS Cloud Point (°C.) | 19 | <−50 |
| Aliphatic/Aromatic Ratio by $^1$H NMR | 2.7/1 | 28/1 |
| Molecular Weight by SEC |  |  |
| Mn | 336 | 390 |
| Mw | 398 | 450 |
| Mz | 523 | 560 |

COMPARATIVE EXAMPLE 26

This example illustrates one difficulty in making alkylation resins in high yield. The aromatic reactant, which is also a solvent in the reaction, must have sufficient solvent power to prevent insolubilization of the complex formed between the catalyst and the alkylation resin product.

A mixture of 480 g of tetrahydronaphthalene was stirred in a reaction flask under nitrogen with 10.0 g. of AlCl$_3$ using the procedure described in Example 1. To this mixture was added a solution consisting of 110 g of DCPD (99+% pure) and 110 g of tetrahydronaphthalene over a 30 minute addition period. Initially a 12° C. exotherm from 25° C. to 37° C. was observed after about 10% of the monomer was added, then no further reaction was observed. The reaction was completed after adding the DCPD, and the agitator was stopped. This allowed a heavy black sludge to settle out, leaving an essentially clear and colorless organic layer. It appeared that all of the catalyst residue was contained in this sludge. A minimal amount of resin product was in the liquid organic layer.

The catalyst sludge contained ~10 g of organic material. This residue was believed to be an alkylation resin formed during the early stages of the reaction. The resin that was formed appeared to be very strongly complexed with the AlCl$_3$, and this complex appeared to be insoluble in the reaction medium. Loss of reactivity and poor yield were due to insolubilization of the catalyst, which then became inaccessible to the reactants.

EXAMPLE 27

This example compares the compatibility of (1) an alkylation resin made by the process of this invention from DCPD and a mixture of naphthalenic aromatic compounds, (2) a hydrogenated DCPD/naphthalenic alkylation resin prepared as described in Example 25, and (3) an aliphatic hydrocarbon resin, with various polymers used in adhesive formulations.

A DCPD alkylation resin having a 122° C. R&B softening point was prepared by reacting SURE-SOL 205 mixed alkylnaphthalene solvent with DCPD at a 10/1 solvent to DCPD ratio according to the procedure described in Example 1. Ten grams of this resin were heated to about 210° C. in a test tube with 10 grams of ELVAX 150 ethylene-vinyl acetate copolymer (EVA) until the resin and polymer formed a uniform mixture. ELVAX ethylene/vinyl acetate copolymers are available from E. I. du Pont de Nemours and Co., Wilmington, Del. The molten mixture was allowed to cool with a temperature probe in the mixture until a slight haze, and then complete clouding of the mixture was observed. The temperature at which the initial haze occured and at which a complete cloud point occured were recorded. This cloud point test is an indicator of the compatibility of the resin with the polymer with which it is mixed. Lower cloud point values indicate better compatibility with the admixed polymer. The same resin was also mixed with ELVAX 220 and 420 EVA copolymers along with REXTAC 2730 amorphous polyolefin polymer and the cloud points in these polymers were measured. REXTAC 2730 polyolefin copolymer is available from Rexene Corp., Dallas, Tex. The respective cloud points are listed in Table 11. These data show that the DCPD alkylation resin has the best compatibility in ELVAX 150, which has the highest vinyl acetate (VA) content of the three EVA polymers. Compatibility decreased with decreasing VA content. The resin showed the poorest compatibility with the wholly aliphatic REXTAC 2730 polymer.

A hydrogenated DCPD alkylation resin was prepared as described in Example 25. The compatibility of this resin in the above polymers was likewise tested by using the procedure described above. The cloud point values for this resin are listed in Table 11. Hydrogenation slightly reduced the compatibility of the resin in the most polar ELVAX 150 polymer, but also improved the compatibility in the less polar ELVAX 420 and REXTAC 2730 polymers.

As a comparison, PICCOTAC® 95 aliphatic hydrocarbon resin available from Hercules Incorporated, Wilmington, Del., was tested using the same procedure.

The results are listed in Table 11. This resin is aliphatic in character and displayed poor compatibility in ELVAX 150 and 220 EVA polymers, but had good compatibility in the less polar ELVAX 420 and nonpolar REXTAC 2730.

The effectiveness of a resin as a tackifier in adhesive formulations is strongly dependent on the compatibility of the resin with the adhesive polymer that the resin is tackifying. The aromatic alkylation resins of this invention are typically better tackifiers for polar polymers because of their high aromatic content. However, as this example illustrates, the aliphatic compatibility of these resins can be improved by hydrogenation to obtain resins that will also be effective adhesive tackifiers for non-polar adhesive polymers.

After soaking, the resin solution was washed with 5% NaOH solution, then with water until neutral. The solution was then added to a 1 liter, round bottom flask, and volatiles were stripped off under nitrogen by heating to 210°–220° C. Steam was applied and the temperature was raised to and maintained at 265°–270° C. to remove any oils and any excess SURE-SOL 175. When 50 ml of the distillate contained only 1 ml of oils, the stripping was complete. Thirty grams of an amber colored resin with a R&B softening point of 166° C. and an Mw of ~2000 was recovered (yield 60%).

EXAMPLE 30

In Example 1 a batch type reaction process was used to prepare an alkylation resin from DCPD and SURE-

TABLE 11

| | Cloud Point (°C.) | | | | | | | |
|---|---|---|---|---|---|---|---|---|
| | ELVAX 150 | | ELVAX 220 | | ELVAX 420 | | REXTAC 2730 | |
| | Initial | Full | Initial | Full | Initial | Full | Initial | Full |
| DCPD Alkylation Resin | <20 | <20 | 43 | 37 | >200 | 95 | >200 | >200 |
| Hydrogenated DCPD Alkylation Resin | 32 | 25 | 40 | 28 | >200 | 47 | >200 | <20 |
| PICCOTAC ® 95 Aliphatic Hydrocarbon Resin | >200 | >200 | 185 | 159 | 91 | 60 | 87 | <20 |

EXAMPLE 28

In this example a high softening point alkylation resin was made from dicyclopentadiene and SURE-SOL 187 (pure methylnaphthalene) as the polycyclic aromatic compound at a low solvent/DCPD ratio. SURE-SOL 187 is available from Koch Chemical Co., Corpus Christi, Tex.

Dicyclopentadiene (DCPD) (80 g) and 75 g of recycled aliphatic hydrogenation solvent (RHS) were added to a mixture of 120 g SURE-SOL 187 and 4 g of aluminum chloride in a 500 ml 3-neck round bottom flask with stirring. The DCPD/RHS was added by drops via an addition funnel over a period of 60 minutes. The temperature was maintained at 45° C. throughout the addition, and during a one hour soak period.

After soaking, the resin solution was washed with water until neutral. The solution was then added to a 1 liter, round bottom flask, and volatiles were stripped off under nitrogen by heating to 210°–220° C. Steam was then applied and the temperature was raised and maintained at 240–250° C. to remove oils and any excess SURE-SOL 187. When 50 ml of the distillate contained only 1–2 ml of oils, the stripping was complete. The yield was 158.8 g of resin (200%) having a softening point of 190° C. and an Mw of 3266.

EXAMPLE 29

In this example an alkylation resin was made from dicyclopentadiene and SURE-SOL 175 (methylbiphenyl) as the polycyclic aromatic compound. SURE-SOL 175 is available from Koch Chemical Co., Corpus Christi, Tex.

Dicyclopentadiene (50 g) combined with 3 g of recycled aliphatic hydrogenation solvent (RHS) was added to a mixture of 200 g of SURE-SOL 175 and 2 g of aluminum chloride in a 500 ml 3-neck round bottom flask. The DCPD/RHS was added by drops via an addition funnel over a period of 5 minutes. The temperature was maintained at 45° C. during the addition, and during a one hour soak period.

SOL 205 mixed alkylnaphthalene solvent. An alternative process is a continuous or semi-continuous process in which the AlCl$_3$ catalyst and naphthalenic aromatic compound are added during the reaction along with the DCPD monomer. In the process described below, the addition of catalyst, solvent, and monomer in four equal increments simulates a continuous reaction scheme where all the necessary ingredients are added simultaneously.

1) SURE-SOL 205 (350 parts), 100 parts of DCPD, and 0.8 part of acetic acid were mixed to form the monomer solution.

2) SURE-SOL 205 (200 parts), 0.15 part of acetic acid (HOAc), and 1.5 parts of AlCl$_3$ were mixed in a reactor purged with N$_2$.

3) One fourth of the monomer solution (1) was added to the reactor over a 5–6 minute period, and held at 45°–50° C.

4) The second increment of 1.5 parts of AlCl$_3$ was added.

5) Step (3), was repeated, adding the second increment of ¼ of the monomer.

6) The third increment of 1.5 parts of AlCl$_3$ was added.

7) Step (3) was repeated, adding the third increment of ¼ of the monomer.

8) The fourth increment of 1.5 parts of AlCl$_3$ was added.

9) Step (3) was repeated, adding the fourth increment of ¼ of the monomer.

10) The reaction temperature was held at 50° C. for 10 minutes.

The final SURE-SOL 205 to DCPD ratio was 5.5/1. An alkylation resin was formed with the properties listed in Table 12. As a comparison, the same procedure was repeated, except that the AlCl$_3$ catalyst and acetic acid cocatalyst levels were reduced by 17%. The final catalyst level was 5 phr of AlCl$_3$ based on DCPD. The properties of this product, listed in Table 12, show that reducing the catalyst level did not affect the resin properties.

As a comparison, an alkylation resin was prepared according to the procedure of Example 5 in which a batch process was used. The properties of this product are also included in Table 12.

This example shows that continuous or incremental addition of all the reaction ingredients is an effective way of producing DCPD alkylation resins. These reaction procedures offer better catalyst efficiency and produce a resin product with slightly higher softening point than the batch reaction process. Reduction in the catalyst level required to attain full conversion is the prime benefit of utilizing a continuous or semi-continuous reaction.

TABLE 12

| SURE-SOL 205/DCPD Ratio | AlCl₃/HOAC (phr) | Yield (% of DCPD) | R&B Softening Point (°C.) | OMS Cloud Pt. 1st haze/full haze | Mw |
| --- | --- | --- | --- | --- | --- |
| 5.5/1 | 6/0.9 | 268 | 138 | 121/112 | ~600 |
| 5.5/1 | 5/0.75 | 270 | 141 | 128/116 | ~600 |
| 5/1 (Example 5) | 6:1.2 | 265 | 138 | 133/125 | 595 |

It is not intended that the examples given here should be construed to limit the invention, but rather they are submitted to illustrate some of the specific embodiments of the invention. Various modifications and variations of the present invention can be made without departing from the scope of the appended claims.

We claim:

1. An essentially amorphous alkylation resin comprising the alkylation reaction product of (a) at least one substituted or unsubstituted polycyclic aromatic compound having at least two aromatic rings, and (b) at least one ethylenically unsaturated hydrocarbon monomer having at least two carbon-carbon double bonds that reacts with the polycyclic aromatic compound by alkylation in the presence of an acid catalyst, wherein the ratio of (a) to (b) in the resin is about 1:9 to about 3:1 by weight, the resin having a weight average molecular weight Mw of less than about 10,000 measured by size exclusion chromatography, and a Ring and Ball softening point of about 50° to about 250° C.

2. The resin of claim 1, wherein the polycyclic aromatic compound is a fused ring aromatic compound.

3. The resin of claim 2, wherein the polycyclic aromatic compound is selected from the group consisting of substituted or unsubstituted naphthalene, anthracene, fluorene, phenanthrene, acenaphthalene, and biphenylene aromatic compounds, and mixtures thereof.

4. The resin of claim 1, wherein the ethylenically unsaturated monomer that reacts by alkylation is a di-olefin.

5. The resin of claim 4, wherein the diolefin contains at least one cyclic olefin group.

6. The resin of claim 5, wherein the diolefin is selected from the group consisting of dicyclopentadiene, 4-vinyl-1-cyclohexene, and 5-vinyl-2-norbornene.

7. The resin of claim 1, wherein the weight average molecular weight Mw is less than about 5,000.

8. The resin of claim 2, wherein the ethylenically unsaturated monomer that reacts by alkylation is a di-olefin, and the weight average molecular weight Mw is less than about 5000.

9. The resin of claim 1, wherein the polycyclic aromatic compound is substituted with a substituent selected from the group consisting of alkyl, cycloalkyl, hydroxy, alkoxy, carboxy, and carbalkoxy groups.

10. The resin of claim 8, wherein the diolefin is dicyclopentadiene.

11. The resin of claim 8, wherein the polycyclic aromatic compound is a naphthalenic aromatic compound.

12. The resin of claim 8, wherein the weight average molecular weight Mw is less than about 3,000.

13. The resin of claim 10, wherein the polycyclic aromatic compound is a naphthalenic aromatic compound, and the weight average molecular weight Mw is less than about 3000.

14. The resin of claim 13, wherein the naphthalenic aromatic compound is selected from the group consisting of naphthalene, alkyl-substituted naphthalenes, and mixtures thereof with alkyl-substituted tetrahydronaphthalenes.

15. The resin of claim 13, wherein the Ring and Ball softening point of the resin is about 100° C. to 170° C.

16. The resin of claim 13, wherein the weight average molecular weight Mw is about 350 to about 1000.

17. The resin of claim 14, wherein the Ring and Ball softening point of the resin is about 100° to 170° C., and the weight average molecular weight Mw is about 350 to about 1000.

18. The resin of claim 17, wherein the Ring and Ball softening point is about 110° C. to about 160° C.

19. The resin of claim 17, wherein the z average molecular weight Mz measured by size exclusion chromatography is about 500 to about 3,000.

20. The resin of claim 10, wherein the dicyclopentadiene is thermally oligomerized dicyclopentadiene.

21. The resin of claim 1, wherein (b) additionally comprises at least one diolefin that reacts by vinyl polymerization.

22. The resin of claim 21, wherein the diolefin that reacts by vinyl polymerization is selected from the group consisting of piperylene concentrate, isoprene, butadiene, and 1,3-hexadiene.

23. The resin of claim 21, wherein (b) comprises a mixture of dicyclopentadiene and piperylene concentrate.

24. The resin of claim 23, wherein the resin has a Ring and Ball softening point of about 50° C. to about 150° C.

25. The resin of claim 24, wherein the resin has a Ring and Ball softening point of about 80° C. to about 120° C.

26. The resin of claim 1, wherein (b) additionally comprises at least one monoolefin.

27. The resin of claim 26, wherein the monoolefin is selected from the group consisting of dihydrodicyclopentadiene, cyclopentene, and norbornene.

28. The resin of claim 26, wherein (b) comprises a mixture of dicyclopentadiene, and a monoolefin selected from the group consisting of dihydrodicyclopentadiene, cyclopentene, and norbornene.

29. The resin of claim 1, wherein the polycyclic aromatic compound is mixed with a benzene aromatic compound.

30. The resin of claim 29, wherein the benzene aromatic compound is selected from the group consisting of benzene, toluene, xylene, ethylbenzene, and mixtures thereof.

31. A process for preparing an essentially amorphous alkylation resin comprising reacting (a) at least one ethylenically unsaturated hydrocarbon monomer having at least two carbon-carbon double bonds that reacts with a polycyclic aromatic compound by alkylation and (b) at least one substituted or unsubstituted polycyclic aromatic compound having two or more aromatic rings, in the presence of an acid catalyst that promotes the alkylation of the polycyclic aromatic compound by the ethylenically unsaturated monomer, to produce an alkylation resin having a weight average molecular weight of less than about 10,000 measured by size exclusion chromatography and a Ring and Ball softening point of about 50° to about 250° C., and wherein the ratio of (b) to (a) in the resin is about 1:9 to about 3:1.

32. The process of claim 31, wherein the polycyclic aromatic compound is a fused ring aromatic compound.

33. The process of claim 32, wherein the polycyclic aromatic compound is selected from the group consisting of substituted or unsubstituted naphthalene, anthracene, biphenylene, acenaphthalene, fluorene, and phenanthrene aromatic compounds, and mixtures thereof.

34. The process of claim 31, wherein the ethylenically unsaturated monomer that reacts by alkylation is a diolefin.

35. The process of claim 34, wherein the diolefin contains at least one cyclic olefin group.

36. The process of claim 35, wherein the diolefin is selected from the group consisting of dicyclopentadiene, 4-vinyl-1-cyclohexene, and 5-vinyl-2-norbornene.

37. The process of claim 31, wherein the weight average molecular weight Mw is less than about 5,000.

38. The process of claim 31, wherein the catalyst is a Lewis acid.

39. The process of claim 38, wherein the Lewis acid is $AlCl_3$.

40. The process of claim 32, wherein the ethylenically unsaturated monomer that reacts by alkylation is a diolefin; the weight average molecular weight Mw is less than about 5,000, and the catalyst is a Lewis acid.

41. The process of claim 31, wherein the polycyclic aromatic compound is substituted with substituents selected from the group consisting of alkyl, cycloalkyl, hydroxy, alkoxy, carboxy, and carbalkoxy groups.

42. The process of claim 40, wherein the diolefin is dicyclopentadiene.

43. The process of claim 40, wherein the polycyclic aromatic compound is a naphthalenic aromatic compound.

44. The process of claim 40, wherein the weight average molecular weight Mw is less than about 3,000.

45. The process of claim 40, wherein the catalyst is selected from the group consisting of $AlCl_3$, $SnCl_4$, $SbCl_5$, and $ZnCl_2$.

46. The process of claim 45, wherein the catalyst is $AlCl_3$.

47. The process of claim 42, wherein the polycyclic aromatic compound is a naphthalenic aromatic compound; the weight average molecular weight Mw is less than about 3,000, and the catalyst is selected from the group consisting of $AlCl_3$, $SnCl_4$, $SbCl_5$, and $ZnCl_2$.

48. The process of claim 47, wherein the naphthalenic aromatic compound is selected from the group consisting of naphthalene, alkyl-substituted naphthalenes, and mixtures thereof with alkyl-substituted tetrahydronaphthalenes.

49. The process of claim 47, wherein the Ring and Ball softening point of the resin is about 100° C. to about 170° C.

50. The process of claim 47, wherein the catalyst is $AlCl_3$.

51. The process of claim 48, wherein the weight average molecular weight Mw is about 350 to about 1000.

52. The process of claim 48, wherein the Ring and Ball softening point of the resin is about 100° C. to about 170° C., the weight average molecular weight Mw is about 350 to about 1,000, and the catalyst is $AlCl_3$.

53. The process of claim 52, wherein the Ring and Ball softening point is about 110° C. to about 160° C.

54. The process of claim 52, wherein the z average molecular weight Mz measured by size exclusion chromatography is about 500 to about 3,000.

55. The process of claim 42, wherein the dicyclopentadiene is thermally oligomerized dicyclopentadiene.

56. The process of claim 31, wherein (b) additionally comprises at least one diolefin that reacts by vinyl polymerization.

57. The process of claim 56, wherein the diolefin that reacts by vinyl polymerization is selected from the group consisting of piperylene concentrate, isoprene, butadiene, and 1,3-hexadiene.

58. The process of claim 56, wherein (b) comprises a mixture of dicyclopentadiene and piperylene concentrate.

59. The process of claim 58, wherein the resin has a Ring and Ball softening point of about 50° C. to about 150° C.

60. The process of claim 59, wherein the resin has a Ring and Ball softening point of about 80° C. to about 120° C.

61. The process of claim 42, wherein the yield of resin is $\geq 250\%$.

62. The process of claim 31, wherein (b) additionally comprises at least one monoolefin.

63. The process of claim 62, wherein the monoolefin is selected from the group consisting of dihydrodicyclopentadiene, cyclopentene, and norbornene.

64. The process of claim 62, wherein (b) comprises a mixture of dicyclopentadiene and a monolefin selected from the group consisting of dihydrodicyclopentadiene, cyclopentene, and norbornene.

65. The process of claim 31, wherein the polycyclic aromatic compound is mixed with a benzene aromatic compound.

66. The process of claim 65, wherein the benzene aromatic compound is selected from the group consisting of benzene, toluene, xylene, ethylbenzene, and mixtures thereof.

67. The process of claim 31, wherein a cocatalyst is also present.

68. The process of claim 67, wherein the cocatalyst is a proton donor.

69. The process of claim 68, wherein the proton donor is acetic acid.

70. The process of claim 47, wherein a cocatalyst is also present.

71. The process of claim 70, wherein the cocatalyst is a proton donor.

72. The process of claim 71, wherein the proton donor is acetic acid.

73. An adhesive composition comprising an elastomer and the resin of claim 1.

74. The composition of claim 73, wherein the resin is present in an amount sufficient to tackify the adhesive.

75. The adhesive composition of claim 74, wherein the resin is hydrogenated.

76. The adhesive composition of claim 74, wherein component (b) of the resin additionally comprises a diolefin reacting primarily by vinyl polymerization.

77. The adhesive composition of claim 74, wherein component (b) of the resin additionally comprises a monoolefin.

78. A composition comprising an engineering polymer and the resin of claim 1.

79. The composition of claim 78, wherein the engineering polymer is selected from the group consisting of polyphenylene ether, polysulphone, and polycarbonate polymers.

80. The composition of claim 79, wherein the engineering polymer is a polyphenylene ether polymer.

81. An ink composition comprising a pigment and the resin of claim 1.

82. An alkylation resin comprising the alkylation reaction product of (a) a naphthalenic aromatic compound and (b) dicyclopentadiene, wherein the z average molecular weight Mz of the resin measured by size exclusion chromatography and the Ring and Ball softening point in ° C. fall within Area A of FIG. 1.

83. A process for preparing an alkylation resin comprising reacting dicyclopentadiene and a naphthalenic aromatic compound in the presence of an $AlCl_3$ catalyst to produce an alkylation resin having a z average molecular weight Mz measured by size exclusion chromatography and a Ring and Ball softening point in ° C. that fall within Area A of FIG. 1.

* * * * *

UNITED STATES PATENT AND TRADEMARK OFFICE
CERTIFICATE OF CORRECTION

PATENT NO. : 5,391,670
DATED : February 21, 1995
INVENTOR(S) : Atanu Biswas & Daniel W. Klosiewicz (Case 1)

It is certified that error appears in the above-indentified patent and that said Letters Patent is hereby corrected as shown below:

Col. 24, line 3, "claim 48" should read --claim 47--.

Signed and Sealed this

Twenty-fifth Day of April, 1995

Attest:

BRUCE LEHMAN

Attesting Officer     Commissioner of Patents and Trademarks